Jan. 9, 1962 L. SPITZER, JR 3,016,341
REACTOR

Filed Oct. 3, 1957 2 Sheets-Sheet 1

INVENTOR
LYMAN SPITZER, JR.

BY Robert A. Lavender
ATTORNEY

Jan. 9, 1962   L. SPITZER, JR   3,016,341
REACTOR
Filed Oct. 3, 1957   2 Sheets-Sheet 2

Fig. 2

INVENTOR
LYMAN SPITZER, JR.

BY Robert A. Lavender
ATTORNEY

United States Patent Office 3,016,341
Patented Jan. 9, 1962

3,016,341
REACTOR
Lyman Spitzer, Jr., Princeton, N.J., assignor to the United States of America as represented by the United States Atomic Energy Commission
Filed Oct. 3, 1957, Ser. No. 688,089
24 Claims. (Cl. 204—154.2)

This invention relates generally to reactors and more particularly to the methods of and apparatus for producing and controlling high temperature reactions, the absorbing of the energy released thereby and the capture of nuclear particles radiated in such reactions.

The present invention is a continuation in part of the invention disclosed and claimed in my prior and copending application for Reactors, filed by me on July 31, 1951, Serial No. 239,419, which has become Patent No. 2,910,414, dated October 27, 1959, which copending application is incorporated herein by reference.

Briefly, one embodiment of the present invention consists of a container in which the reacting materials (referred to hereinafter in this specification and the appended claims as "reactants") are confined, and in which nuclear reactions (so-called atomic) energy is generated or released in the form of high energy radiation or emitted nuclear particles. The changed form of reactant particles created by the reactions will be referred to hereinafter in this specification and in the appended claims as "reacted particles." The reactants during reactions are in the form of a gas.

Embodiments of the invention are given the coined name "stellarators," as the reactions taking place within the container of the embodiments or species of the invention are similar in some respects to the reactions taking place in some of the stars.

In one preferred embodiment of the invention, the container is in the general form of a continuous or closed tube, and the tube may have enlarged sections at intervals along its length. The tube is surrounded by: (1) a medium or a layer of a material to slow down or moderate the radiated particles and absorb the radiated energy thereof; (2) a medium or a layer of a material to capture the slowed radiated particles; (3) an electromagnetic coil wound coaxially the tube to produce and impose a "confining" magnetic field on the space within the tube; (4) "ohmic heating" electromagnetic coils wound on a plurality of toroidal iron cores which cores embrace the tube; and (5) "high heating" electromagnetic coils wound coaxially the tube and directly over the enlarged sections of the tube, but inside of and separated from the confining coils by metallic shields, the details of all of which will be set forth hereinafter.

The coils wound on the iron cores form the primary of a transformer, the secondary of which is the reactant gas within the tube. It will be noted that when current flows through the gas secondary, the reactants will be heated in proportion to the ohmic resistance of the gas circuiting the tube and the square of amperes of current flowing through the gas. This heating of the gas by the coils on the iron cores is defined herein and in the appended claims as "ohmic heating." The reactants are heated by ohmic heating to a temperature of approximately $10^6$ degrees Kelvin, which temperature is defined herein and in the appended claims as an "intermediate temperature."

The heating of the gas by the coils wound directly on the enlarged sections of the tube is defined as "high heating."

A separate primary coil of a single (or more) turn may also be wound on these iron cores to apply a magnetic field axially the tube, to aid in the ionization and the electrical breakdown of the gas in the tube.

The confining field coil is wound continuously along the tube except at one or more abrupt enlargements in the walls of the tube and in each such enlargement is positioned a "divertor" electromagnetic coil, to divert the reactant particles that have approached near the walls of the tube into the enlargement of the tube, from whence they are removed by vacuum pumps.

The moderating and energy absorbing medium is preferably in the form of a liquid which is confined in a space immediately outward of the reactant tube. This space may be created by the walls of the container tube and the walls of a second tube or a shell of material radially outward of the container tube. The absorbing medium acts as a coolant and is circulated by a pump through this space and through the primary of a conventional heat exchanger, the secondary of the heat exchanger being connected to a heat engine, such as a turbine.

The reactants within the tube are preferably the lighter gaseous elements in the atomic scale and during the initiation of reactions and during the continuation of reactions the reactants are in a gaseous form. The reactants are fed through jet orifices into the container in the form of gases, liquids or finely divided solids, either continuously or intermittently, and the reacted particles are withdrawn from the tube by the aid of the divertor magnetic field and a vacuum pump. When liquids or solids are used as reactants, the thermonuclear reactions are initiated by the use of a gas reactant, whereupon the liquids or solids, when injected into the container, are immediately vaporized into gases by the heat of the reactants and the reactions continue unabated.

*Standard condition stellarator*

For purposes of description and the analysis of the relations between physical dimensions and the physical forms of a typical stellarator and of the variable operating conditions of the invention, a "standard condition" stellarator is disclosed in general as a round and continuous tube of 100 cm. in diameter and bent into the form of a "figure-8," the end sections or loops thereof being bent into circular shapes and having a radius of curvature of 350 cms. The total length of the tube is about 90 meters. The end loops may be in parallel planes or, as in one embodiment disclosed herein, the end loops may be in planes at an angle to each other. The magnetic field imposed on the reacting zone in the tube is of the order of 20,000 gausses and the kinetic temperature in the reacting zone in the tube is of the order of $10^8$ degrees, Kelvin. These general dimensions and values and the values of other operational variables will be referred to hereinafter as "standard" conditions.

The principal object of the invention is to provide a stellarator as a source of high energy radiated nuclear particles.

Another object of the invention is to provide a stellarator as a source of high energy nuclear particles and to transform the energy of said particles into heat as a source of mechanical power.

Another object of the invention is to provide a stellarator as a source of radiated nuclear particles to react with the nuclei of target elements to form, by nuclear capture, other isotopes of other elements.

Another object of the invention is to provide a stellarator as a source of neutrons for further nuclear reactions.

Another object of the invention is to provide a stellarator in which high temperature reactions are confined substantially to the central axial zone of the reactor tube.

Another object of the invention is to provide a stellarator in which the walls of the reaction tube are protected from the high temperatures within the reaction tube by the use of a magnetic field.

Another object of the invention is to provide a stellarator in which a highly ionized gas at a high temperature is confined in an endless tube by means of an axial magnetic field characterized by a rotational transform.

Another object of the invention is to provide a stellarator tube in the form of a figure-8, the end loops of which tube are in planes at an angle to each other.

Another object of the invention is to provide a stellarator in which the walls of the reaction tube are protected from high temperature reactant ions and reacted particles by removing a major portion of them as they approach the walls of the tube and before they actually touch the walls of the tube.

Another object of the invention is to provide a stellarator in which the walls of the tube are protected from the high temperatures within the reaction tube by lowering the density of the reacting and reacted particles near the walls of the tubes.

Another object of the invention is to reduce to a minimum the power required to initiate thermonuclear reactions in a stellarator.

Another object of the invention is to raise thermonuclear reactants to intermediate temperatures by subjecting the reactants to ohmic electric current heating.

Another object of the invention is to raise thermonuclear reactants to thermonuclear temperatures from an intermediate temperature by subjecting the reactants to a pulsing magnetic field.

Another object of the invention is to provide a stellarator in which the material for slowing down and absorbing the energy of the radiated nuclear particles is heavy water.

Another object of the invention is to provide a stellarator in which the material for capturing the radiated nuclear particles is lithium.

Other objects of the invention will become apparent from the following description of a preferred embodiment of the invention, including the drawings made a part thereof, and in which.

Theory and general requirements of a stellarator

The thermonuclear reactions between hydrogen isotopes deuterium and tritium are well known and may be expressed by the equations:

(1)

where $H^2$ is a deuteron, $H^3$ is a triton, n is a neutron, $H^1$ is a proton and the released energy is expressed in millions of electron-volts (mev.). As indicated in Equation 1, either a triton or a neutron is formed by the reaction between two deuterons; the triton reacts immediately with a deuteron and $$H^3 + H^2 \rightarrow He^4 + n + 17.6 \text{ mev.} \tag{2}$$

where $He^4$ is an alpha particle or a nucleus of helium.

Deuterons react with lithium ($Li^6$) according to the equation (3)

where $Be^7$ is an isotope of beryllium.

It is, of course, apparent that other thermonuclear reactants are readily available to those skilled in the art. (See Review of Modern Physics, vol. 22 (1950), p. 291, et seq.)

It has also been established that two light nuclei can react with each other and liberate atomic energy, as distinguished from elastic collisions, only when they approach each other to within about $10^{-12}$ cm. As these nuclei carry electrostatic charges, their relative velocities must be very high to overcome the electrostatic repulsion between nuclei at these extremely short distances. It is also known that the velocities of nuclei may be expressed in terms of temperature and, as the phenomena of nuclear reactions involve directly the velocities of the nuclei, T is defined as the "kinetic temperature" of these moving nuclei. All temperature values in this specification will be expressed on the Kelvin scale, except as otherwise noted.

In analyzing the interaction between two moving atomic particles, the "collision parameter" b is defined as the distance of closest approach of two particles to each other that would result if there were no force exerted between them. In a collision between two hydrogen nuclei, each with a charge e, the deflection of each nucleus from their respective random directions will be about 90 degrees or more, provided that their mutual electrostatic energy at the distance b, numerically equal to $e^2/b$, is as great or greater than the kinetic energy ($3kT/2$) of the particles, where k is the usual gas constant. If T equals $10^8$ degrees, these two energies are equal when b equals approximately $10^{-11}$ cm., which is approximately ten times the radius of the nucleus. It is thus apparent that virtually no thermonuclear reactions will take place if T is less than $10^6$ degrees and to achieve an appreciable reaction rate T must be approximately $10^8$ degrees or more.

A second requirement is that the density of the interacting particles be kept low. This is necessary if the pressure of the gas is to be sufficiently low to avoid explosions. If n is the number of particles per cubic cm., or particle density, the pressure in atmospheres should be approximately $10^{-6}$ nkT, where k is the gas constant. If the pressure in the reactor tube is not to exceed 10 atmospheres, and T is $10^8$ degrees, then n must not exceed $10^{15}$ particles per cubic cm., which is less than the particle density of ordinary air by about 1/10,000.

At the low densities required for a practical and steady operation of a stellarator operating with a constant magnetic field in the reactor tube, an ion or electron will spend most of its time moving freely within the reaction zone, that is, its free path between collisions is very long. For example, if the particle density n in the reactor is $10^{14}$ per cubic cm., a deuteron will travel 300 kilometers before it is deflected 90° or more by a collision with another deuteron. The cumulative effect of many small deflections will decrease this mean free path to about 3 kilometers. If the deuteron collides during this time with the walls of the reactor, whose operating temperature should not exceed some thousand degrees, the deuteron will lose a large part of its hundred-million-degree energy. Evidently, to maintain sufficiently high reacting temperatures, that is, thermonuclear temperatures, which are necessary for the reactions to continue, the nuclei must be prevented from hitting the walls. If the ions move in straight lines, this requirement would result in a container whose dimensions would be many kilometers, which is clearly impractical.

To keep the ions from hitting the walls of the reactor, some type of force is required that will act at a distance from the walls. Gravitational forces are too small. Electrical forces act oppositely on positive ions and electrons and cannot simultaneously confine both types of particles. Since electrons must always be present in numbers equal to the positive ions, to avert the production of colossal electrical fields, and since the electrons will tend to possess the same energy as the positive nuclei, both types of particle must be confined or kept away from the walls of the reactor container or tube. A magnetic field is, therefore, provided to confine both the electrons and the positive ions within a small volume central axial reaction zone and thereby prevent them from colliding with the walls of the tube.

In the presence of a strong magnetic field, a charged particle simply circles about the lines of force of the field, and moves only slowly across the field. For a deuteron moving at 1000 kilometers per second, corresponding to a kinetic temperature of about $10^8$ degrees, the radius of curvature of the deuteron in a magnetic field of 20,000 gausses is approximately 1 cm., and for an electron the radius of curvature is about .015 cm. If a high electric current is caused to flow through a coil positioned axially and along the length of a tube, and the tube is bent so that the two ends are joined to form a continuous tube, most of the magnetic lines of force will stay inside the tube and charged particles will tend to follow these lines of force, without encountering the walls.

*Power equilibrium in an ideal reactor*

In analyzing the performance of an ideal reactor tube, the magnetic field will first be assumed to be so strong that the positive ions and electrons are confined within a central axial zone in the tube. The energy requirements and the physical dimensions of wire and coils to produce such a magnetic field are available in the prior art. Collisions of particles with the walls will be ignored here, but will be considered in full detail hereinafter.

The rate at which power is generated by thermonuclear reactions and the rate at which heat is lost by radiation are the two more important factors involved, as it is evident that the power generated must considerably exceed the power radiated if a sufficient margin of operability is to exist when the imperfections of the magnetic field are considered.

A short segment, of only 1 cm. in length, of a reactor tube of circular cross section and with a radius $r$ will be considered first.

The number of particles per cubic cm. will again be equal to $n$, and their kinetic temperature equal to $T$. It will be assumed: that the positive ions have an average charge of $Z.e$, where $Z$ is the atomic number of the particle; that the number of electrons ($n_e$) equals $Z$ times the number of positive ions ($n_i$), and that the sum $n_e+n_i$ equals $n$. If $N$ is the number of nuclear reactions taking place in each cubic cm. per second, $E$ the energy liberated per reaction, and $P_N$ the nuclear power generated per cm. length of the tube, $E.N$, then, is the power generated per cubic cm./sec. and as $\pi r^2$ is the area of the tube cross section, $$P_N = \pi r^2 E.N \qquad (4)$$

The probability that one ion collides with another varies as $n_i$, the density of positive ions per cubic cm., and $N$, the total number of reactions per cubic centimeter per second, is given by the equation $$N = \alpha n_i^2 \qquad (5)$$

where $\alpha$ is a constant that depends on the temperature of the reaction zone. In terms of the reaction cross section $\sigma$ and the Maxwellian distribution function $P(v)$ for the relative velocities of the ions, it is evident that $$\alpha = Z_1 Z_2 \int_0^\infty \sigma v P(v) \, dv \qquad (6)$$

where subscripts 1 and 2 designate, respectively, the two types of interacting positive ions in the tube, $Z_1$ is the fraction of the ions which are of type 1, and $Z_2$ is the corresponding fraction of type 2. If only one type of positive ion is present, the product $Z_1 Z_2$ may be set equal to one-half.

As will be seen hereinafter, the total number of particles per cubic cm. bears a critical relationship to the strength $H$ of the magnetic field. This relationship is defined by the factor $x$ in the equation:

$$x = \frac{8\pi n k T}{H^2} \qquad (7)$$

where $H$ is the strength of the magnetic field in the tube in gauss. Since the average ionic charge is $Z.e$, it is evident that $$n_i = \frac{n}{1+Z} \qquad (8)$$

Combining Equations 4, 5, 7 and 8, $P_N$ becomes $$P_N = \frac{\alpha x^2 r^2 E H^4}{64\pi (1+Z)^2 k^2 T^2} \qquad (9)$$

For the deuteron-triton reaction at $10^8$ degrees, $\alpha$ is approximately $2 \times 10^{-17}$ cm.$^3$/sec., and $E$ is 17.6 mev., or $2.8 \times 10^{-5}$ ergs. (See Review of Modern Physics, vol. 22, 1950, p. 291.) This value of $E$ includes only the energy directly liberated, and neglects the additional energy which might be obtained from the liberated neutrons in subsequent reactions outside the reactor. If $H$ is made to equal $2 \times 10^4$ gausses, $x$ to equal $\frac{1}{2}$, $r$ to equal 50 cm., $Z$ to equal 1, and $T$ to equal $10^8$ degrees, and with equal amounts of deuterons and tritons in the tube, then $n$ equals $5 \times 10^{14}$ per cubic cm., $n_i$ equals $n/2$ and for these initially determined "standard" conditions, $$P_N = 37,000 \text{ watts/cm.} \qquad (10)$$

These determined values are within practical operation ranges.

Four-fifths of this nuclear energy generated per cm. length of the reactor tube would be carried away from the reaction zone by the neutrons produced, with some 7 kilowatts per centimeter available as kinetic energy of the alpha particles, which would mostly be retained in the reactor.

The radiations of energy by the ions and electrons must also be considered. The electrons will be accelerated as they pass by the ions, emitting a pulse of electromagnetic radiation. The radiated power $P_R$ may be computed from quantum mechanics by the equation:

$$P_R = \frac{x^2 r^2 E_0 Z^3}{2\pi^2 (1+Z)^2} \cdot \frac{e^2 h}{3 m_e^2 c^3} \cdot \left(\frac{kT}{2\pi m_e}\right)^{1/2} \frac{H^4}{k^2 T^2} \qquad (11)$$

where $E_0$ is the ionization energy of the H atom, $m_e$ is the mass of the electron, $h$ is Planck's constant, and the other symbols have their usual meanings. (See Astrophysical Journal, vol. 95, 1942, p. 329.) For the standard conditions specified hereinbefore, $$P_R = 510 \text{ watts/cm.} \qquad (12)$$

This radiative loss is clearly negligible compared with $P_N$. Generation of radio waves by electrons spiraling around magnetic lines of force is also negligible, since the radiated energy is absorbed by one electron as fast as it is produced by another, and very little energy escapes.

For the deuteron-deuteron reaction, α is less by a factor of about 100, and $P_N$ will be comparable with $P_R$. (See FIGURE 1, page 302 and pp. 297, 298 and 300, Review of Modern Physics, vol. 22.) However, a moderate increase of T will increase α about as $T^2$ (see Equation 9), keeping $P_N$ nearly constant, while $P_R$ will decrease (see Equation 11).

Evidently the ratio of $P_R$ to $P_N$ is independent of the quantity $x$, which is proportional to the density of the reacting gas. Thus a sustained thermonuclear reaction is possible in a stellarator for values of $x$ much less than 0.5, and at correspondingly reduced densities, and such low-density operation may be preferred in some embodiments.

It has been found that the specific electrical resistivity, η of an ionized electron-proton (or electron-deuteron) gas may be defined by the equation $$\eta = \frac{1.3 \times 10^5}{T^{3/2}} \text{ ohm-cm.} \qquad (13)$$

where T is the temperature in degrees K. (See Proceedings Royal Society London, vol. 183, p. 456, or Physics of Fully Ionized Gases, Interscience Publishers, 1956.)

For T equals $2 \times 10^5$ degrees, η is $1.4 \times 10^{-3}$ ohm-cm. and for a tube 1 meter in diameter and 90 meters long, the total resistance around the stellarator is $1.6 \times 10^{-3}$ ohms. If the ohmic heating current be $10^5$ amperes, the heat dissipated by the current will be $1.6 \times 10^7$ watts or 16,000 kilowatts. If $n$ equals $5 \times 10^{14}$ per cm.$^3$, then η, here defined as the total number of particles in the tube, would be equal to $3.5 \times 10^{22}$, and if all of the energy dissipated goes into increasing the kinetic energy, $3/2 \times \eta kT$, of the electrons and deuterons and the gas constant $k$ is $1.38 \times 10^{-16}$ ergs/degree, and T is the absolute temperature, this temperature would rise at the rate of 22,000 degrees per millisecond.

Once ionization is practically complete, there is no radiation by electrons bound in atoms, since virtually all the electrons are free. The loss of radiant energy by free electrons colliding with deuterons (or protons or tritons) has been computed in Equation 11 and shown to be negligible. Thus all loss of energy by electromagnetic radiation may be ignored, once ionization is practically complete. Since the main confining magnetic field prevents losses at the walls, almost all the energy dissipated by the electric current will go directly into the kinetic energy of the deuterons and electrons and thus into increasing the temperature of the gas; there is no place else for this energy to go. However, the rate of temperature increase will not remain constant, but will fall off as T increases.

At temperature much above $10^6$ degrees, heating by means of $i^2R$ losses is not suitable, since the resistance R becomes so small, the resistivity of an ionized gas varying inversely as $T^{-3/2}$, where T is the absolute temperature. For example, at $10^8$ degrees the specific electrical resistivity of a completely ionized deuteron-electron gas is only a tenth that of copper at room temperature, and even with enormous currents the rate of heating is not very great.

For heating at these higher temperatures a variation of the magnetic field with time is provided. It is well established that increasing the magnetic field increases the energy of charged particles in the field. (See Spitzer, Physics of Fully Ionized Gases, Interscience Publishers, Equations 1–16.) This familiar "betatron effect" forms the basis for the first method of heating disclosed in the referenced application, where the gas was heated by increasing the primary magnetic field. Conversely, decreasing the magnetic field decreases the energy of charged particles.

Figures 3, 4, 5, 6, 7, 8:
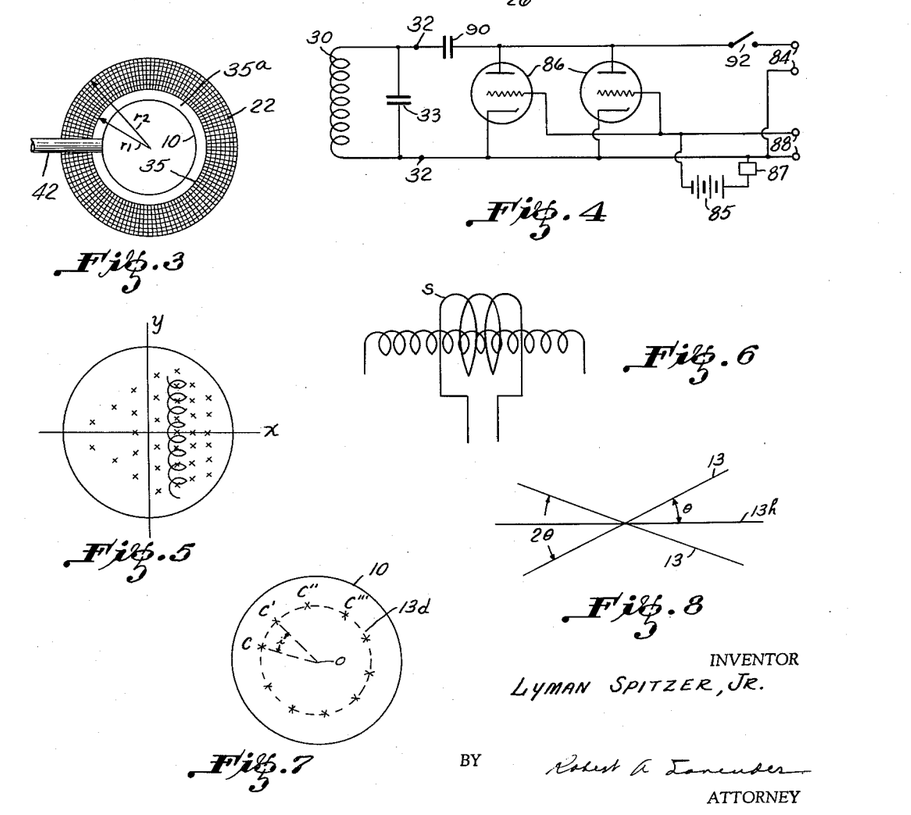
FIGURE 3 is a cross section view of the tube taken on line 3—3, FIGURE 2.
FIGURE 4 is a line diagram of the electrical circuits for heating the reactant gas by a changing or alternating magnetic flux.
FIGURE 5 is a schematic diagram showing the relation between individual lines of force in a magnetic field (the lines of force moving into the plane of the paper) and the drifting of the spiraling positive ions in the $-y$ direction, when the magnetic field increases in intensity in the $+x$ direction.
FIGURE 6 is a line diagram of a circuit of a short electromagnetic coil superimposed over another and longer electromagnetic coil.
FIGURE 7 is a line cross-sectional schematic diagram of the container tube of a stellarator, showing the points of intersection of a single line of force of a magnetic field as it intersects the cross section upon consecutive circuits around the tube.
FIGURE 8 is a line sketch showing the positional relations of the planes of the end loops in one embodiment of a stellarator.

If in a long solenoid, such as is disclosed in FIGURE 6, the field in a short section S of the length of the superimposed solenoid is varied, the particles in this length will be heated as the magnetic field is increased. If the frequency of oscillation of the field is so chosen that the heated particles leave this section S just before the field decreases again, many of the heated particles will escape from the section, carrying their additional kinetic energy away with them. Similarly, when the magnetic field is decreased, the energy of the charged particles in section S is decreased, and some of these less energetic particles also escape into the section of the solenoid where the magnetic field is constant. It may be shown that there is a net energy gain during one complete cycle, since the particles whose energy is increased gain more energy than is lost by the particles whose energy is decreased. Thus an alternating magnetic field in section S, when superimposed on the main confining magnetic field, heats the gas in the stellerator tube. It will be noted that the two fields, when combined, create a pulsating field, for while one component of the field is alternating the total field is unidirectional and pulsating.

If $H_1$ is the maximum value of the oscillating field, which is assumed to vary between $+H_1$ and $-H_1$ with the frequency $f$, in cycles per second, and if $H_0$ is the intensity of the main magnetic field, both in gausses, then the total magnetic field H, along the axis of the tube, is the sum of the two fields, or $$H = H_0 + H_1 \cos 2\pi f t \qquad (14)$$

The energy gained does not depend on $H_0$ and $H_1$ separately, but only on their ration $H_1/H_0$. To make the rate of heating as large as possible, it is desirable to decrease $H_0$. If all the lines of force are to remain within the tube, the total flux through a cross section of the tube must be the same through all the tube cross sections, and hence if $H_0$ is decreased in one section of the tube, the cross-sectional area A of the tube in that section must be increased so that the product $AH_0$ remains constant. Thus it is desirable to insert an enlarged section or a bulge in a straight section of the tube between the two curving end loops of the figure-8. The radius of the tube cross section in the bulge is approximately 1.4 times the corresponding radius elsewhere in the tube, the main confining magnetic field may be decreased by a factor two in the bulge, and becomes about 10,000 gausses, if this field is 20,000 gausses elsewhere in the stellarator.

While such a bulge may not be required in all embodiments of the invention, it has the advantage that it increases the reacting volume and decreases the energy required to maintain the main confining magnetic field. A similar increase in the cross section of the end sections is not possible without increasing the overall dimensions of the entire system, which would result, in turn, in an increase in cost of the initial investment. Also, it may be shown that an increase in the radius of the tube cross section in the curving sections decreases the density of particles that may be confined by the magnetic field, while a corresponding increase of tube radius in the straight sections does not, within certain limits, have this effect.

For maximum rate of heating, the time required for the phase of the oscillatory magnetic field $H_1$ to change through about one radian, or roughly 60°, should be about the length of time required for a deuteron to pass axially through the accelerating region. It is well known from the kinetic theory of gases that at a temperature T, the root mean square velocity of a deuteron in one direction is equal to $(kT/m^{1/2})$, where $k$ is the gas constant, and $m$ is the deutron mass. If T is $10^8$ degrees K., this velocity is $6.4 \times 10^7$ cm./sec. If the length of the accelerating region, in which the main confining field is modulated by the A.C. field $H_1$, is 20 feet, the time for a deuteron to pass through this region is $0.95 \times 10^{-5}$ sec. The frequency for most efficient heating is then one-sixth of $(0.95)^{-1} \times 10^5$, or about 17 kilocycles per second.

Heating at other frequencies is also possible. If the frequency is resonantly close to the collisional frequency in the gas, it may be shown that relatively efficient heating is possible. However, the collisional frequency varies as $T^{-3/2}$ and this frequency decreases by a factor of 1000 as T increases from $10^6$ to $10^8$ degrees K.

Finite cylindrical reactor

Referring particularly to FIGURES 1, 2 and 3, 10 is a container in which are confined the reactants undergoing thermonuclear reactions. In the present embodiment the container 10 has the general form of a continuous tube bent into a "figure-8" shape, with two end loops 12, 12. In the present embodiment of the invention, the planes 13, 13 of the two end loops 12, 12, as shown in FIGURE 8, are each at an angle $\theta$ from the plane 13$h$, which may be horizontal or otherwise. The angle between the two planes 13, 13 is $2\theta$. In other embodiments, the positions of the end loops 12, 12 may be in separated parallel planes.

Reference is made to FIGURE 5 which shows the path of a positive ion in the cross-sectional plane of a curving end loop. Because of the inhomogeneity of the magnetic field, the charged particle drifts across the lines of force, as shown (see H. Alfin, Cosmical Electrodynamics, Oxford Press, 1950, chapter 2, and L. Spitzer, Physics of Fully Ionized Gases, Interscience Publishers, chapter 1). Particles of opposite sign drift in opposite directions, producing an accumulation of electric charge which cannot easily flow across the magnetic field, and which produce electric fields that impair the confinement of the gas. In the figure-8 geometry, the particle drifts are in opposite directions in the two curving end sections; positive ions that drift up in one end section drift down in the other. Thus a tendency for positive charge to accumulate in one end section will be cancelled out by the tendency for opposite charges to accumulate on the same line of force in the other end section, since electric charges can readily flow along a line of force. Thus, electric fields will not tend to be produced with a figure-8 geometry.

A greater cancellation of these fields may be achieved as disclosed in the present embodiment of a stellarator in which the end loops 12 are tilted to each other by an angle $2\theta$, the plane 13, 13 of each end loop being inclined to the horizontal plane 13$h$ at an angle $\theta$. (See FIGURE 8.) In this configuration it may be shown that a line of force $x$ which intersects a cross-sectional plane in a point C will after one circuit around the stellarator, intersect the same plane not in the point C but in some other point C', as shown in FIGURE 7. One and only one line of force will always intersect the cross-sectional plane in the same point, O. This line of force is called the "magnetic axis." The successive intersections, C, C', C" . . . of any other line of force than the magnetic axis, with the cross-sectional plane rotate by an angle $i$ around the point O. This rotation of successive intersection points, when a single line of force is followed for many circuits around a stellarator, is called a "rotational transform," and the angle of rotation is called the "rotational angle."

When a rotational transform is present, a single line of force, intersecting a cross-sectional plane infinitely many times, traces out a closed curve in the cross-sectional plane as indicated by dotted line 13$d$. In space a single line of force traces out an entire surface. Since an electric current can readily flow along a line of force, any excess of charge anywhere on the surface will quickly be averaged out over the entire surface. With this configuration the drifts shown in FIGURE 5 cannot lead to the injurious steady fields which would be present with an axial magnetic field in a simple race-track or doughnut-shaped field.

Tube 10 is made of a magnetic-permeable and electrical nonconducting material, such as glass or ceramic or other suitable material, and which should be able to withstand comparatively high emperatures, such as up to 1000 degrees K. The tube 10 is preferably of uniform diameter, except at a plurality of enlarged sections or bulges 14, positioned along the length of the tube, the positions of which are indicated generally by the dotted lines 16, and except at the position of the divertor 18, which is shown in detail in FIGURE 2. The enlarged sections 14 are enclosed in magnetic shields 20, with a space between the shields and the walls of the tube.

Throughout the length of tube 10, including the shields of the enlarged sections 14, is wound the reaction confining electromagnetic coil 22, having an inner radius of $r_1$ and an outer radius of $r_2$, the planes of the turns of the winding being at right angles to the axis of the tube 10, such that when a current flows through coil 22 the lines of force of the induced magnetic field, shown by lines 23, will be axial the tube, that is, parallel to the axis of the tube. The currents applied to this coil 22 are supplied from power source 26 and are unidirectional and may be steady or intermittent. The currents are controlled by conventional switches and circuit breakers. The coil 22 passes around divertor 18 and the turns per linear length of the coil are increased at the edges of the divertor 18, as at 24, to provide a thicker coil at these points in order to have a more uniform magnetic flux in the space across the coil gap in the divertor.

The electrical power required per cm. length to maintain a steady magnetic field H within the tube 10 by the coil 22 may be calculated from standard equations involving the parameters of the values $r_1$ and $r_2$ for the size of the coil and the number of turns and the currents therethrough, and hence the available voltages, to obtain the most favorable selection of ampere-turns. Likewise, the characteristics of the coolants, their volumes and velocities are subject to wide selections as have been thoroughly developed and widely published in the literature.

Figure 1:
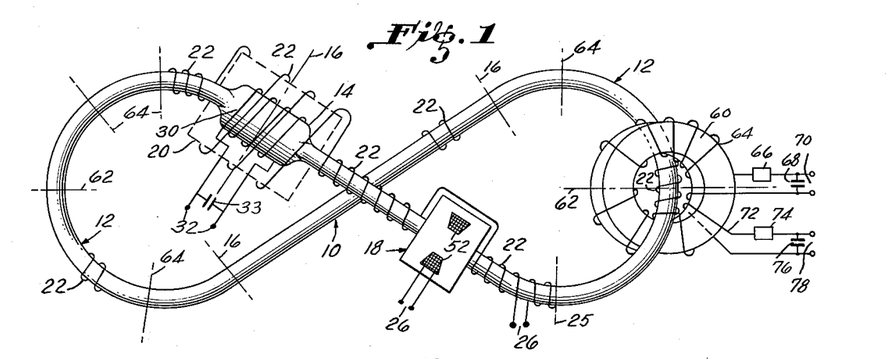
FIGURE 1 is a plan view of a stellarator tube, showing one enlarged section of the tube in cross section, one iron core primary unit in perspective and the relative position of a divertor.

The tube 10 is enlarged to form a bulged section 14 at a plurality of positions along its length. Three such positions are indicated in FIGURE 1, as dotted lines 16. Immediately over the tube 10 at these positions are wound the high heating coils 30. These coils are connected individually to a source of A.C. power, as at 32. Across each pair of terminals of coils 30 is connected a bank of condensers 33 which form, with the inductance coil 30, a tuned circuit.

To ensure that the flux produced by coils 30 does not penetrate coil 22, shield boxes 20 are placed around each of the predetermined sections at 16, 16 where coils 30 are positioned. Spaces between coils 30 and the shield boxes 20 are provided for the passage of the return flux from the interior of coils 30. If the wall thickness of the shield box is much greater than the depth to which alternating electrical fields are limited by skin effect at the frequency used in coils 30, then the alternating magnetic field produced by coils 30 will not get out of the shield box, and will therefore not penetrate the sections of coil 22, which are situated outside the shield box. However, the main confining magnetic field which is produced by coil 22 will penetrate the shield box, as this main magnetic field is increased slowly over a period of a few seconds. Coil 22 at each end of the shield box may be enlarged, with some turns of the coil placed around the outside of the shield box, if desired, to maintain the required value of the main confining field within the tube inside coil 30 that is inside the shield box. For the thickness of shield boxes 20, see Radio Engineers' Handbook by F. E. Terman (McGraw-Hill, 1943, page 34).

The tube 10 is surrounded by a second tube 35 which is made of some magnetic field permeable material that readily captures the moderated nuclear particles radiated from the reaction zone in tube 10. In the space 35$a$ between tubes 10 and 35 is circulated a medium, such as heavy water, for slowing down or moderating the reacted particles and absorbing the energy radiated in the nuclear reactions taking place within the tube 10. The radiated energy is absorbed as heat by the medium, which is circulated through space 35a by pump 36 and is conveyed by pipes 37, 38 and 39 to and from the primary of a conventional heat exchanger 40. The secondary of heat exchanger 40 is connected to a conventional heat engine, such as a turbine.

It is obvious that the moderating medium and the energy absorbing medium may be of different materials and circulated through separate tubes as a matter of structural convenience. The absorbing medium, for example, may be molten lithium or some molten lithium compound such as lithium nitrate or lithium nitrite. In case lithium is used, tritium is formed. The radial thickness of water required to moderate the neutrons may be readily determined from well known calculations or from such references as the Reactor Handbook, USAEC, AECD-3645. The thickness of the water and lithium mediums is approximately equal to the radius of tube 10 or, for the standard condition stellarator is about 50 cm.

It is also obvious that the nuclear particles radiated by the nuclear reactions in tube 10 may be used for other nucleonic reactive purposes. It is also obvious that should the moderating medium be placed in a tube separate from tubes 10 and 35, tube 35 could be removed from the stellarator assembly without disturbing either the tube 10 or the circulating medium tube. Both the absorbing tube 35 as well as the coil 22 may have water or other cooling agents circulated through or around them in small separate tubes in a conventional manner.

A pipe 42 passes through coil 22, tube 35, space 35a and into tube 10 to supply the tube 10 with reactants, which materials are forced under the pressure of pump 43 through the orifice 44 at the inner end of tube 42.

The reactants are forced into tube 10 at a pressure to produce a high velocity jet, that is, of about one kilometer per second. This velocity for the standard stellarator is preferred, as it is desirable that the particles arrive at the central reacting zone by the time they reach thermonuclear temperatures. The magnetic field does not stop the mass motion of the jet, since polarization charges on the sides of the jet will produce an electrical field which counterbalances the effect of the magnetic field. In addition, these jets play a part in carrying current across the magnetic field and thus tend to neutralize space-charge effects.

Figure 2:
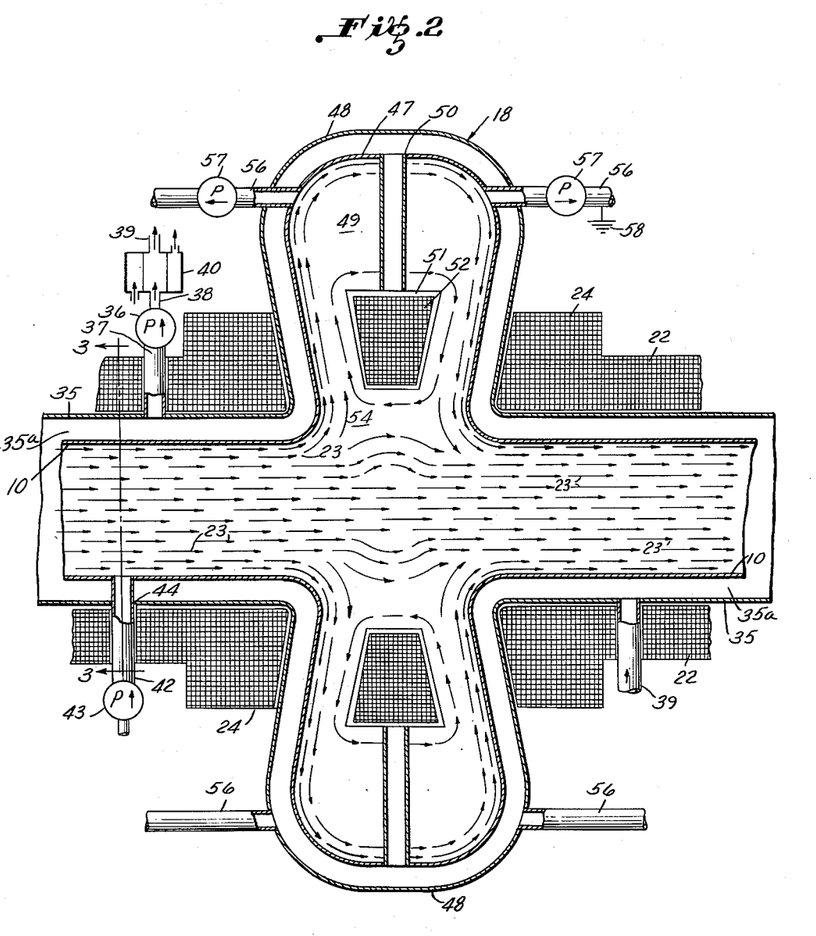
FIGURE 2 is a horizontal cross section view of the tube at the position along the tube of a divertor, which divertor is shown in detail, and showing the tube and its covering layers or mediums, the space for a cooling medium, and a heat exchanger and connections thereto.

The divertor, shown generally at 18 in FIGURE 2, is constructed by extending the walls of tubes 10 and 35 radially outward and joining the radial sections by sections 47 and 48, respectively, to form the space 49. The inner section 47 of tube 10 is extended inwardly, as at 50, and the inner ends of these extensions are expanded apart to form a space 51. In this space 51 is positioned coil 52, which may have the same physical characteristics, such as turns per square inch cross section, and may be connected to the same source of power, as at terminals 26 of coil 22.

The coil 52, however, is so wound and is so connected to the D.C. power source 26 that the magnetic lines of force thereby created will divert the lines of force 23, that are near walls of tube 10 and are about to pass the divertor 18, into the space 49 and form a magnetic field of a pattern, shown generally at 54. It will be noted that if the coil 52 is connected to the same source of power as the confining coil 22, the magnetic field 54 in the divertor 18 increases at the same rate as the main confining field 23.

It is thus apparent that nuclear particles following the lines of force 23 and drifting toward and near the walls of tube 10 are diverted before they actually strike the walls of tube 10 and are drawn into the space 49 where they strike the inner wall at 47. The particles may then be withdrawn from the tube 10 by vacuum pumps 57 connected to pipes 56 that extend into space 49. By grounding the pipes 56, as at 58, any electrical charges on the particles entering space 49 and striking the wall 47, are neutralized and pipes 56 and tubes 10 and 35 and sections thereof are maintained at zero potential.

Referring particularly to FIGURE 1, the iron toroidal cores 60, positioned along the tube 10, as at dotted lines 62, are threaded by the tube 10 and its coil 22. Upon each of the cores 60 are wound coils 64, the terminals of which are connected to a condenser bank 68 and to a power source 70 through a conventional ignitron switch 66.

To maintain an axial current of $10^5$ amperes through the gas in the standard stellarator, with its resistance of $1.6 \times 10^{-3}$ ohms, requires a voltage of 160 volts. Such a voltage would be produced by the transformer coils 64 were there ten turns on the cores 60 and the primary current be a pulse of 10,000 amperes at 1600 volts. This current may be furnished by condenser 68 having a capacity of 5 farads, which could maintain such a pulse for a period as long as a tenth of a second. Alternately, a D.C. generator would be able to maintain such a current for a longer time. With a cross-section area of the iron cores 60 equal to four square feet, twenty of such rings would make possible a pulse of 160 volts for 0.1 second before magnetic saturation of the iron in the cores occurs. Thus, the reactants in tube 10 are heated to an intermediate temperature.

In some operating conditions, a voltage of 160 volts around the gas path of the standard stellerator may be insufficient to break down the gas initially and produce enough electrons to carry a current. The discharge of condenser 76 would create a high voltage through the gas in the tube 10 for at least a fraction of a millisecond and this high voltage would accelerate any stray electrons in the gas to sufficient energies to assure the ionization of the gas and to dissociate the deuteron molecules and thus produce enough current so that $i^2R$ losses can appear, when the lower voltage from source 70 is applied.

Another method of applying this ionizing pulse would be to make D.C. source 70 an A.C. source and eliminate condenser 68.

According to the kinetic theory of gases, to heat all the gas in the tube to an absolute temperature T degrees K. requires a total kinetic energy, U, of $3/2\eta kT$, where $k$ is again the gas constant and $\eta$ is again the total number of particles in the tube. With the dimensions of the standard stellarator, the volume of the stellarator is about $7 \times 10^7$ cm.$^3$. With $2.5 \times 10^{14}$ deuterons per cm.$^3$ and an equal number of electrons, $\eta$ is $3.5 \times 10^{22}$. If T is $10^8$ degrees, U is $7.3 \times 10^{14}$ ergs, or $7.3 \times 10^7$ joules. If the heating time is to be one second, the power that must be fed into the 15 kc. oscillations of the field would be 73,000 kilowatts. To provide this power, a circuit as that shown in FIGURE 4 would be employed, where the inductance of coil 30 and the capacity of condenser 33 are designed to resonate at a predetermined frequency. A plurality of tubes 86, connected through switch 92 to a D.C. power supply 84, would then maintain the oscillations. A separate conventional driver circuit 88 supplies A.C. voltage at the proper frequency to the grids of the tubes 86. As presently available high-power tubes are capable of delivering about 2000 kilowatts each, a group of at most 40 such tubes in parallel will provide the required power. A blocking condenser 90 is provided to prevent a large D.C. current from flowing in the inductance 30. A D.C. potential source 85 is connected across the grid-filament circuits of tubes 86 to block the tubes 86 until the ignitron 87 disconnects source 85.

The circuit shown is schematic only, and many obvious modifications will occur to those skilled in the art of electronic design. The reactive power in the LC circuit would considerably exceed the resistive power delivered to the tubes, corresponding to the fact that only a small percentage of the power put into the oscillating magnetic field in each cycle goes into heating the gas.

*Operation*

Analysis of a typical embodiment of the invention, referred to hereinbefore as a standard condition stellarator, with statements of the general or typical limits of operational values of the various associated power requirements and the sequence of operational steps are as follows:

Vacuum pumps 57, connected to space 49 through pipes 56, are started.

The tube 10 is evacuated of air to about $10^{-6}$ mm. of Hg and deuterium and tritium of approximately equal parts by volume, are admitted into the tube until the reactant particle density reaches the desired value. As pointed out hereinbefore, the density should in general not exceed $10^{15}$ particles per cubic cm. A density of $5 \times 10^{14}$ particles per cubic cm. is selected as a practical maximum value, corresponding to a pressure of $4 \times 10^{-3}$ mm. of Hg before ionization and heating occurs. A lower pressure may be used if desired, with correspondingly reduced power.

Coolants are circulated through space 35a and the electromagnetic coils and respective heat exchangers.

The D.C. voltage is then applied to coils 22 and 52 to establish the main confining field and the divertor magnetic field, the currents through the coils being controlled so as to build up the confining magnetic field to a value of 20,000 gausses. It is preferable that this field be built up slowly, that is, in several seconds.

A high D.C. voltage is applied to terminals 70, but with ignitron switch 66 open so that condenser bank 68 is charged and no voltage is applied to coils 64.

A high negative biasing potential from D.C. source 85 is applied to the grids of tubes 86, with switch 87 closed. Switch 92 is then closed and the D.C. power supply 84 is applied to the tubes 86. Because of blocking condenser 90, no current flows through coil 30.

The heating of the reactants through the first or intermediate stage is then ready to start.

Ignitron switch 74 is then fired, and D.C. voltage, of preferably about 30,000 volts, is induced along the gas circuit or path in the tube 10. This E.M.F. accelerates the free electrons in the gas to ionization velocities and the ionization progressively increases rapidly.

When the voltage across condenser 76 has dropped to about 160 volts, ignitron switch 66 is fired and D.C. power supply at preferably about 1600 volts is applied to the primaries 64 of the iron core transformers and the current through the gas (secondary of the transformer) gradually rises to about $10^6$ amperes and with the rising current the temperature of the gas rises by ohmic heating. When the temperature of the gas rises much above $2 \times 10^5$ degrees, the resistance of the primary 64 prevents the primary current from rising much above 10,000 amperes, or the current in the gas from rising much above $10^5$ amperes.

After the currents have been applied to the primary 64 for about one tenth (0.1) of a second, by which time the temperature of the gas is approximately $10^6$ degrees, the iron cores become saturated and the voltage around the gas in the tube disappears and the D.C. power source 70 is no longer needed. The source is disconnected by a mechanically timed switch.

As coil 52 has been connected to the same D.C. power source as coil 22 and as some reactant particles have been withdrawn from the tube 10 into space 49 and thence out of space 49 through tubes 56, fresh reactant particles are introduced into the tube 10 through tube 42.

The heating of the reactants through the second or high stage is then ready to start.

By firing ignitron 87, the voltage bias on tubes 86 is removed and the output of the conventional driver is applied to terminals 88, which output, by controlling the tubes 86 at frequencies corresponding to the LC values of coil 30 and condenser 33, applies an alternating voltage to coils 30, whereupon an alternating magnetic field is produced that heats the gas in tube 10. The temperature then rises to high temperatures.

If the temperature, as measured by the neutron yield, has reached sufficiently high temperatures, the power supply to the driver connected to terminals 88 is turned off, the voltage on the grids of tubes 86 no longer varies and currents to coils 30 cease to flow.

Fresh reactant particles are continued to be forced into the tube 10 and reacted particles are continued to be withdrawn from the tube 10 by coil 52 and by the pump 57 connected to pipes 56, the density of the reactant gas in tube 10 remaining about $5 \times 10^{14}$ particles per cubic cm.

The operation of the stellarator is stopped by either turning off the flow of the reactants into tube 10 by closing a valve in the reactants supply line 42 or by cutting off the power supply to coil 22 that provide the confining magnetic field.

There is thus disclosed a stellarator having a continuous tube bent in the form of a figure-8 with the end loops at an angle to each other, with electrical circuits for ionizing the reactants within the tube, ohmic heating the reactants to an intermediate temperature, heating the reactants to very high temperatures, confining the reactants substantially to the axial portion of the tube, diverting the reactants and reacted particles from the tube as they approach the walls of the tube and moderating and absorbing the nuclear radiation generated during the reactions and making the energy in the radiation available for mechanical power.

I claim:

1. The method of raising a gas to high temperature and producing neutrons therein in a closed endless tube having circular end loops and intercrossing sections connecting said end loops, having at least one enlarged section and at least one divertor section therein comprising: confining gas reactants selected from isotopes of hydrogen in said tube to form a circuitous gas path in said tube; applying an electric current to said path to ohmically heat the said path to an intermediate temperature; applying a varying magnetic field axially the tube at said enlarged sections; applying a first unidirectional magnetic field having a rotational transform axially the tube to concentrate reactant and reacted particles in the axial portion of the tube; and applying a second unidirectional magnetic field in said divertor section in a direction opposite to said first unidirectional magnetic field, whereby the said first magnetic field in the immediate vicinity of the walls of said tube is diverted into said divertor sections.

2. The method defined in claim 1, and further characterized by the said varying magnetic field being pulsating.

3. The method defined in claim 1 and further characterized by the said varying magnetic field being alternating.

4. The method of raising a gas to high temperature and producing neutrons therein in a closed endless figure-8 shaped tube having at least one enlarged section and at least one divertor section therein comprising: confining gas reactants selected from isotopes of hydrogen in said tube to form a circuitous gas path in said tube; ionizing said path; applying an electric current to said path to ohmically heat the said path to an intermediate temperature; applying a varying magnetic field axially the tube at said enlarged sections; applying a first unidirectional magnetic field having a rotational transform axially the tube to concentrate reactant and reacted particles in the axial portion of the tube; applying a second unidirectional magnetic field in said divertor section in a direction opposite to said first unidirectional magnetic field, whereby the said first magnetic field in the immediate vicinity of the wall of said tube is diverted into said divertor section; and removing any reactant and reacted particles from said divertor section that become diverted into said divertor section.

5. Apparatus for raising a gas to high temperature and producing neutrons therein comprising a continuous endless tube having reactants therein selected from isotopes of hydrogen and having at least one divertor section; means for ohmic heating said reactants to an intermediate temperature; means for heating said reactants to high temperature and to produce neutrons by nuclear reactions therein; means having a rotational transform for substantially confining said reactants to a central axial portion of said tube; and means for removing from said tube and at said divertor section the reactant and reacted particles approaching the walls of said tube.

6. The combination defined in claim 5 and further characterized by the said divertor means consisting of a radially expanded section of the tube and forming a gap in the said tube, and an electromagnetic divertor coil positioned radially said gap and connected to a direct current source, whereby the magnetic field produced by said divertor coil diverts into the space encompassed by said expanded tube the lines of force in the said tube that are immediately adjacent the walls of said tube.

7. Apparatus for raising a gas to high temperature and producing neutrons therein comprising a continuous endless tube having circular end loops, intercrossing sections connecting said end loops, reactants therein selected from isotopes of hydrogen and having at least one divertor section; means for ionizing said reactants; means for ohmic heating said reactants to an intermediate temperature; means for heating said reactants to high temperature and to produce neutrons by nuclear reactions therein; means having a rotational transform for substantially confining said reactants to a central axial portion of said tube; and means for removing from said tube and at said divertor section the reactant and reacted particles approaching the walls of said tube.

8. The combination defined in claim 7 and further characterized by the said confining means consisting of a source of direct current connected to an electromagnetic coil wound axially and continuously around and throughout the length of the said tube.

9. The combination defined in claim 7 and further characterized by the high heating means consisting of a source of alternating current connected to an electromagnetic coil wound on an enlarged section of said tube to produce an alternating magnetic field axially said tube.

10. The combination defined in claim 7 and further characterized by the said confining means consisting of a source of direct current connected to an electromagnetic coil wound continuously around and throughout the length of said tube including an enlarged portion, the said confining coil being wound outside and over said high heating means, but separated therefrom by a metal shield of such thickness as to be impermeable to said alternating magnetic field.

11. Apparatus for raising a gas to high temperature and producing neutrons therein comprising a continuous endless tube having reactants therein selected from isotopes of hydrogen and having at least one divertor section; means for ohmic heating said reactants to an intermediate temperature; means for heating said reactants to high temperature and to produce neutrons by nuclear reactions therein; means having a rotational transform for substantially confining said reactants to a central axial portion of said tube; means for removing from said tube and at said divertor section the reactant and reacted particles approaching the walls of said tube; and means for moderating radiated nuclear particles and absorbing the nuclear energy released by said reactants.

12. Apparatus for raising a gas to high temperature and producing neutrons therein comprising a continuous endless tube having reactants therein selected from isotopes of hydrogen and having at least one divertor section; means for ohmic heating said reactants to an intermediate temperature; means for heating said reactants to high temperature and to produce neutrons by nuclear reactions therein; means having a rotational transform for substantially confining said reactants to a central axial portion of said tube; means for removing from said tube and at said divertor section the reactant and reacted particles approaching the walls of said tube; liquid means for moderating radiated nuclear particles and absorbing the nuclear energy released by said reactants; and means for circulating said moderating and absorbing means through heat exchangers.

13. Apparatus for raising a gas to high temperature and producing neutrons therein comprising: means forming an endless continuous tube having reactants therein selected from isotopes of hydrogen and having at least one enlarged section and having at least one divertor section; means for ohmically heating said reactants to an intermediate temperature; means applied at said enlarged sections for heating said reactants; means having a rotational transform applied along said tube for heating said reactants and for substantially confining said reactants to a central axial portion of said tube; and means for diverting from said tube the reactant and reacted particles approaching the walls of said tube.

14. Apparatus for raising a gas to high temperature and producing neutrons therein comprising means forming an endless: a continuous tube having circular end loops, intercrossing sections connecting said end loops, reactants therein selected from isotopes of hydrogen and having at least one enlarged section and having at least one divertor section; means for ionizing said reactants; means for ohmically heating said reactants to an intermediate temperature; means applied at said enlarged sections for heating said reactants; means having a rotational transform applied along said tube for heating said reactants and for substantially confining said reactants to a central axial portion of said tube; and means for diverting from said tube the reactant and reacted particles approaching the walls of said tube.

15. The combination defined in claim 14 and further characterized by the said ionizing means consisting of an alternating current source connected to a coil on a core encircling said tube.

16. The combination defined in claim 14 and further characterized by the said intermediate heating means consising of a direct current source connected to a coil on an iron core embracing said tube.

17. Apparatus for raising a gas to high temperature and producing neutrons therein comprising: means forming an endless continuous tube having reactants therein selected from isotopes of hydrogen and having at least one enlarged section and having at least one divertor section; means for ionizing and ohmic heating said reactants to an intermediate temperature; means applied at said enlarged sections for heating said reactants; means having a rotational transform applied along said tube for heating said reactants and for substantially confining said reactants to a central axial portion of said tube; and means for diverting from said tube the reactant and reacted particles approaching the walls of said tube.

18. Apparatus for raising a gas to high temperature and producing neutrons therein comprising: a continuous endless tube having circular end loops, intercrossing sections connecting said end loops, reactants therein selected from isotopes of hydrogen and having at least one enlarged section and having at least one divertor section; means for ionizing said reactants; means for ohmically heating said reactants to an intermediate temperature; means applied at said enlarged section for heating said reactants; means having a rotational transform applied along said tube for heating said reactants and for substantially confining said reactants to a central axial portion of said tube; means for diverting from said tube the reactant and reacted particles approaching the walls of said tube; and means for removing said reactant and reacted particles from the space within said divertor.

19. The combination defined in claim 18 and further characterized by the removing means consisting of vacuum pumps connected to a source of mechanical power and to the space within said divertor.

20. Apparatus for raising a gas to high temperature and producing neutrons therein comprising: a continuous endless tube having circular end loops, intercrossing sections connecting said end loops, reactants therein selected from isotopes of hydrogen and having at least one divertor section; means for ohmically heating said reactants to an intermediate temperature; means for creating a magnetic field within and axially said tube to heat said reacants to high temperature and to produce neutrons by nuclear reactions therein; means for applying a confining magnetic field having a rotational transform within and axially said tube; and means for diverting into said divertor section the lines of force of said confining magnetic field flowing in the immediate vicinity of the walls of said tube.

21. Apparatus for raising a gas to high temperature and producing neutrons therein comprising: a continuous endless tube having circular end loops, intercrossing sections connecting said end loops, reactants therein selected from isotopes of hydrogen and having at least one enlarged section and at least one divertor section; means for ohmically heating said reactants to an immediate temperature; means for creating a magnetic field at said enlarged section and within and axially said tube to heat said reacants to high temperature and to produce neutrons by nuclear reactions therein; means for applying a confining magnetic field having a rotational transform within and axially said tube; and means for diverting ino said divertor section the lines of force of said confining magnetic field flowing in the immediate vicinity of the walls of said tube.

22. Apparatus for raising a gas to high temperature and producing neutrons therein comprising: a continuous endless tube having circular end loops, intercrossing sections connecting said end loops, reactants therein selected from isotopes of hydrogen and having at least one enlarged section and at least one divertor section; means for ionizing said reactants; means for ohmically heating said reactants to an intermediate temperature; means for creating a magnetic field at said enlarged section and within and axially said tube to heat said reactants to high temperature and to produce neutrons by nuclear reactions; means for applying a confining magnetic field having a rotational transform within and axially said tube; and means for diverting into said divertor section the lines of force of said confining magnetic field flowing in the immediate vicinity of the walls of said tube.

23. Apparatus for raising a gas to high temperature and producing neutrons therein including: a continuous endless tube having circular end loops, intercrossing sections connecting said end loops, reactants therein selected from insotopes of hydrogen and having at least one enlarged section and at least one divertor section; at least one iron transformer core embracing said tube; an electromagnetic coil wound on each of said cores; an electromagnetic coil wound on and axially said tube at each of said enlarged sections; an electromagnetic coil wound continuously on and axially said tube to produce therein a magnetic field having a rotational transform, except at said divertor sections; and an electromagnetic coil wound axially said tube and in said divertor section.

24. Apparatus for raising a gas to high temperature and producing neutrons therein including: a continuous endless tube having circular end loops, intercrossing sections connecting said end loops, reactants therein selected from isotopes of hydrogen and having at least one enlarged section and at least one divertor section; at least one iron transformer core embracing said tube; a plurality of electromagnetic coils wound on each of said cores; an electromagnetic coil wound on and axially said tube at each of said enlarged sections; an electromagnetic coil wound continuously on and axially said tube to produce therein a magnetic field having a rotational transform, except at said divertor sections; and an electromagnetic coil wound axially said tube and in said divertor section.

References Cited in the file of this patent

UNITED STATES PATENTS 2,910,414   Spitzer ________________ Oct. 27, 1959

FOREIGN PATENTS 637,866   Great Britain ____________ May 31, 1950

OTHER REFERENCES

R. F. Post: Reviews of Modern Physics, vol. 28, No. 3, July 1956, pages 338, 339, 344, 345, 346, 347, 349, 359–362.

Atomics and Nuclear Energy, February 1958, pages 58, 59, "Thermonuclear Fusion," British and American Progress Report.

Physical Society of London, Proceedings, vol. 64(B), 1951, Feb. 1, 1951, S. W. Cousins and A. A. Ware, pages 159–166.

Physical Review 59 (1941), pp. 997–1004 (an article by Smith), Nuclear Energy II (1957), vol. 5, pp. 71–85.